(12) United States Patent
Diniz

(10) Patent No.: US 11,325,705 B2
(45) Date of Patent: May 10, 2022

(54) DRONE CLOUD CONNECTIVITY FOR ASSET AND FACILITY OPERATIONS

(71) Applicant: Unmanned Laboratory, Newton, MA (US)

(72) Inventor: Giovani D. Diniz, Newton, MA (US)

(73) Assignee: Unmanned Laboratory, Newton, MA (US)

( * ) Notice: Subject to any disclaimer, the term of this patent is extended or adjusted under 35 U.S.C. 154(b) by 151 days.

(21) Appl. No.: 16/445,587

(22) Filed: Jun. 19, 2019

(65) Prior Publication Data

US 2019/0382113 A1    Dec. 19, 2019

Related U.S. Application Data

(60) Provisional application No. 62/686,981, filed on Jun. 19, 2018.

(51) Int. Cl.
*B64C 39/02* (2006.01)
*G07C 5/00* (2006.01)
*G07C 5/08* (2006.01)
*G05D 1/10* (2006.01)
*G06Q 10/00* (2012.01)
*B64D 1/18* (2006.01)

(52) U.S. Cl.
CPC ........... *B64C 39/024* (2013.01); *G07C 5/008* (2013.01); *G07C 5/085* (2013.01); *B64C 2201/123* (2013.01); *G05D 1/106* (2019.05)

(58) Field of Classification Search
USPC .......................................................... 701/3
See application file for complete search history.

(56) References Cited

U.S. PATENT DOCUMENTS

| | | | |
|---|---|---|---|
| 2016/0246297 A1* | 8/2016 | Song | H04B 7/18506 |
| 2017/0061813 A1* | 3/2017 | Tao | G09B 9/46 |
| 2017/0253330 A1* | 9/2017 | Saigh | B64C 39/024 |
| 2018/0239840 A1* | 8/2018 | Santarone | G02B 27/0172 |
| 2019/0138667 A1* | 5/2019 | Benesh | G06Q 10/063 |
| 2019/0304026 A1* | 10/2019 | Lyman | G06Q 50/165 |
| 2019/0382113 A1* | 12/2019 | Diniz | G07C 5/085 |

* cited by examiner

*Primary Examiner* — Tyler D Paige
(74) *Attorney, Agent, or Firm* — Mintz, Levin, Cohn, Ferris, Glovsky and Popeo, P.C.

(57) ABSTRACT

Aspects of the current subject matter relate to enhanced operation services provided by an unmanned vehicle with cloud-based connectivity for real-time exchange of data and command/control operations. Data collected during a mission for an operation service, such as a particular inspection activity, is transmitted in real-time to a server for analysis to provide real-time or near real-time feedback in the form of command and/or control signals to the unmanned vehicle to improve the operation service while it is being carried out. The collected data is also used for simulations and to create historical content for future operation services.

19 Claims, 7 Drawing Sheets

DRONE CLOUD CONNECTIVITY FOR ASSET AND FACILITY OPERATIONS

CROSS-REFERENCE TO RELATED APPLICATIONS

This application claims priority to U.S. Provisional Patent Application No. 62/686,981, filed on Jun. 19, 2018, incorporated herein by reference in its entirety.

BACKGROUND

Inspections of assets and facilities, such as, for example, industrial assets or facilities, may require detailed analyses that are difficult, dangerous, and perhaps not feasible for human surveyors to complete. For example, hazardous or extreme conditions may limit the accessibility of an asset. Additionally, human-surveyed inspections of assets are limited by the knowledge and skill base of a particular human surveyor performing an inspection. Unmanned systems may be utilized to replace or supplement human inspections but are limited in their ability to adapt and respond to surroundings, conditions, and/or data.

SUMMARY

Aspects of the current subject matter relate to providing enhanced operation services by an unmanned vehicle (such as a drone) with cloud-based connectivity for real-time exchange of data and command/control operations.

According to an aspect of the current subject matter, a method includes receiving, by a server, drone configuration parameters related to a drone and operation service parameters related to an operation service to be performed by the drone; establishing, by the server, a communication connection between the server and the drone; collecting, by the server, real-time operational data from the drone; and providing, by the server, operational instructions to the drone, where the operational instructions are based on one or more of the drone configuration parameters, the operation service parameters, and the real-time operational data.

According to an inter-related aspect of the current subject matter, a system includes at least one data processor, and at least one memory storing instructions which, when executed by the at least one data processor, result in operations including, receiving drone configuration parameters related to a drone and operation service parameters related to an operation service to be performed by the drone; establishing a communication connection between the system and the drone; collecting real-time operational data from the drone; and providing operational instructions to the drone, where the operational instructions are based on one or more of the drone configuration parameters, the operation service parameters, and the real-time operational data.

According to an inter-related aspect of the current subject matter, a non-transitory computer readable medium is provided. The non-transitory computer readable medium stores instructions, which when executed by at least one data processor, result in operations including, receiving, by a server, drone configuration parameters related to a drone and operation service parameters related to an operation service to be performed by the drone; establishing, by the server, a communication connection between the server and the drone; collecting, by the server, real-time operational data from the drone; and providing, by the server, operational instructions to the drone, where the operational instructions are based on one or more of the drone configuration parameters, the operation service parameters, and the real-time operational data.

In some variations, one or more of the features disclosed herein including the following features can optionally be included in any feasible combination. The drone configuration parameters and the operation service parameters may be user inputs inputted into an external processing unit connected to the server. The server may transmit, in response to a determination by the server that a success probability of the operation service exceeds a predetermined threshold, an initiation message to the drone, the initiation message indicating the drone can begin the operation service. The success probability may be based on a series of simulations utilizing a simplified model of the drone and the operation service to be performed by the drone. The server may implement, in response to receipt from the drone of a computational request, the computational request. Implementing the computational request may include instructing the drone relating to positioning of the drone to capture data for the computational request. The server may generate a simulation of the operation service, the simulation based at least in part on the real-time operational data from the drone. The operational instructions may include one or more warning messages, the one or more warning messages relating to one or more of success probability, restriction assessments, and collision estimates. The server may control, after a predefined period of time after transmission of a collision estimate warning message, the drone to halt operations in response to a determination of a possible collision. The server may provide an application programming interface to an external processing unit to provide control relating to the drone and the operation services to a user of the external processing unit.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to inspection operations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
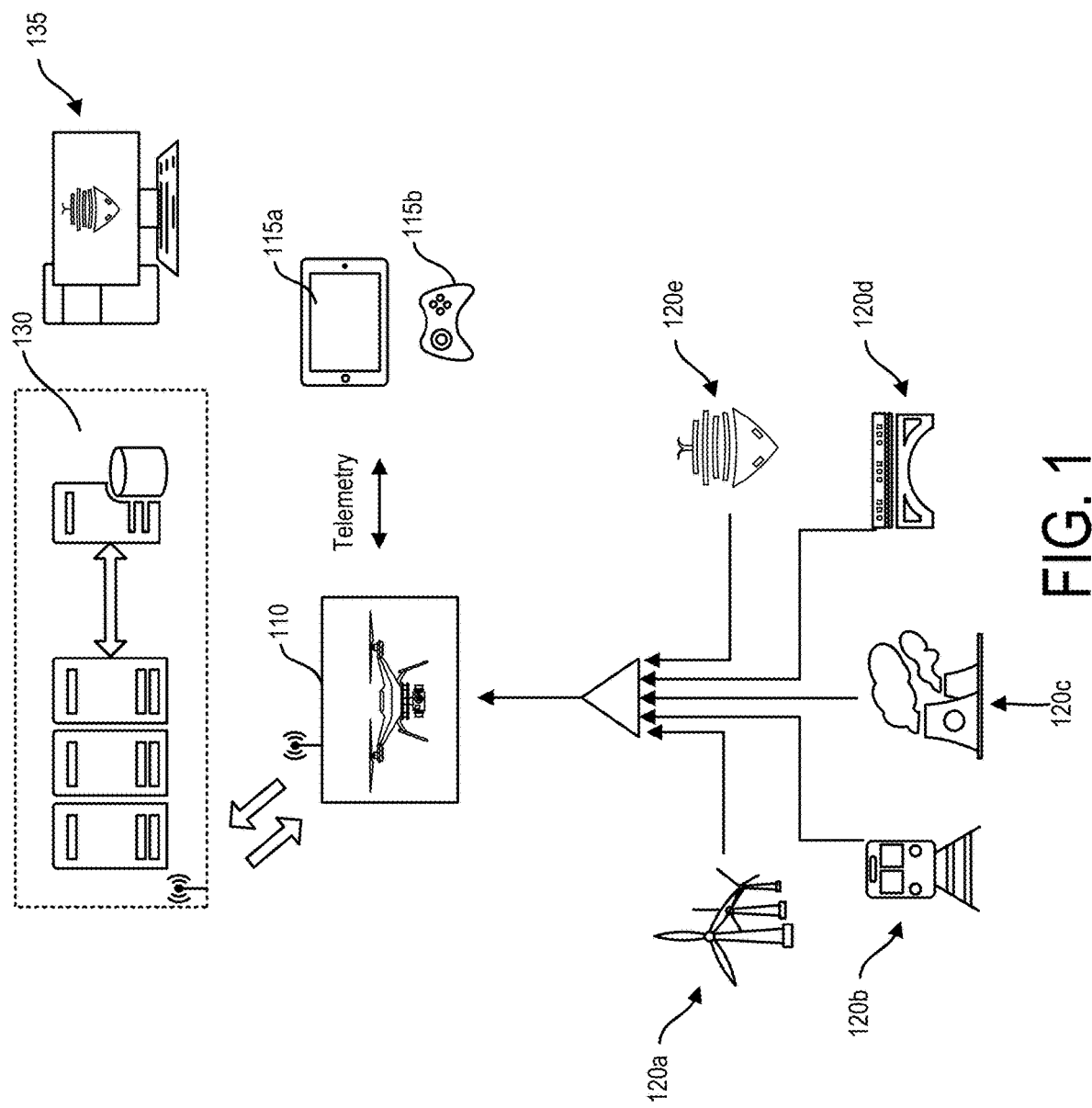
FIG. 1 is a block diagram representation of a system in which operation services by an unmanned vehicle with cloud-based connectivity consistent with implementations of the current subject matter may be implemented.

Aspects of the current subject matter relate to enhanced operation services provided by an unmanned vehicle (such as, for example, an aerial drone or a land-based drone) with cloud-based connectivity for real-time exchange of data and command/control operations.

Although certain aspects are described with respect to inspections with drones, the subject matter is not limited to inspection uses. The approaches consistent with implementations described herein can be utilized in various other operations and environments such as, for example, any type of operation in which it may be desirable and/or useful to receive and respond to real-time command and control operations. Such operations may include, for example, agricultural uses, traffic management, disaster relief, and industrial or city planning or development. Moreover, while some aspects of the current subject matter are described with relation to aerial drones, the subject matter is not limited to aerial drones, and other types of unmanned vehicles or systems can also be utilized.

Inspections of assets such as, for example, industrial assets or facilities (e.g., a power plant, a military or commercial vessel, etc.), may expose human surveyors to hazardous environments. The human surveyors may need to rely on their own experiences and knowledge, and data related to the inspection may be scarce and fragmented. Moreover, in certain situations, human surveyors may not be capable of obtaining data necessary for a complete inspection. Thus, utilizing human surveyors for such inspection operations may result in a laborious, dangerous, subjective, unreliable, and/or inconsistent process.

Unmanned systems, including unmanned vehicles, may be used to assist inspection activities to address some of the difficulties with human surveyors. Conventional systems in which unmanned vehicles, such as drones, are utilized may include a human operator locally controlling an unmanned vehicle via a radio link. Data collected during the mission (e.g., the particular inspection activity) may be stored locally and uploaded to one or more remote databases after the mission is completed. In such conventional implementations, information is not collected and analyzed during the mission to provide real-time or near real-time feedback in the form of command and/or control signals to the unmanned vehicle to improve the process while it is being carried out. Additionally, onboard processors (e.g., on the unmanned vehicle) are inherently limited in processing power due to power, size, and weight constraints.

To overcome these and other limitations, aspects of the current subject matter provide an architecture in which extended computational power (e.g., processing power for complex computational models that incorporate elements of numerical simulation and machine learning in real-time) is available to an unmanned vehicle performing a mission (e.g., an inspection or other operation) while such mission is being conducted.

According to aspects of the current subject matter, cellular connectivity is incorporated in the hardware of the unmanned vehicle to establish secure communication channels between the unmanned vehicle and one or more servers for real-time exchange of data and command and/or control signals. Communication over cellular networks, consistent with implementations of the current subject matter, may remove pre-existing constraints with radio link range and power consumption and also serves as a safety mechanism by providing additional vehicle control redundancy.

FIG. 1 is a block diagram representation of an exemplary system 100 in which operation services (also referred to as missions) by an unmanned vehicle with cloud-based connectivity consistent with aspects of the current subject matter may be implemented. As shown in FIG. 1, an unmanned vehicle (e.g., a drone) 110 is provided and may be deployed to one or more assets and/or facilities 120a-120e. While five exemplary assets/facilities (a wind-powered facility (120a), a railroad system (120b), a nuclear power plant (120c), a bridge (120d), and a shipping vessel (120e)) are shown in FIG. 1, the current subject matter is not limited to these and may instead be extended to any number of environments in which it may be desirable and/or useful to receive and respond to real-time command and control operations. The unmanned vehicle 110 may optionally be controlled by one or more local controllers 115a,b that communicate via, for example, a radio link with the unmanned vehicle 110. The one or more local controllers 115a,b may include, for example, a handheld controller, a tablet, a mobile phone, and the like. A cloud-based server 130 is coupled to and communicates with the unmanned vehicle 110 over a network, such as a cellular communication network through associated cellular connectivity hardware of the unmanned vehicle 110 and the server 130. The server 130 may include a plurality of processors capable of implementing, for example, complex computational models that incorporate elements of numerical simulation and machine learning in real-time, as well as additional processing. Additional capabilities of the server 130 are provided below with reference to the exemplary services described. An external processing unit 135 may be coupled to the server 130 and configured to display data from the server 130, as well as to receive and transmit user-generated input to the server 130.

Aspects of the current subject matter provide for remote operation of the server 130 based on the provision of computational services. These computational services may be classified as 'persistent' or 'on-demand' services according to the nature of their processes. For example, on-demand services may be initiated from incoming requests from vehicle or ground control, have limited life-cycle, and generate established outcomes. Persistent services, on the other hand, may run continuously on the server 130. Persistent services may, for example, provide a remote access point to stakeholders to extract data from inspections or other operations, provide real-time traffic control of airspace, and include automated data curation, analytics, and application programming interfaces (APIs) for external connections and automation.

According to some aspects of the current subject matter, the persistent and on-demand services are developed and operated independently, but may share data sources with each other. Such compartmentalization may provide a level of redundancy and hierarchy to, for example, promote safety.

In operation, consistent with implementations of the current subject matter, the system 100 provides enhanced mission services by connecting a local, onboard computer of the unmanned vehicle 110 with the extended computational power available in the server 130, (e.g., a cloud server). In this context, the server 130 provides the necessary intelligence and services to support data collection, mission quality, and decision-making on the field while the onboard computer performs basic communication and data storage tasks.

Figure 2:
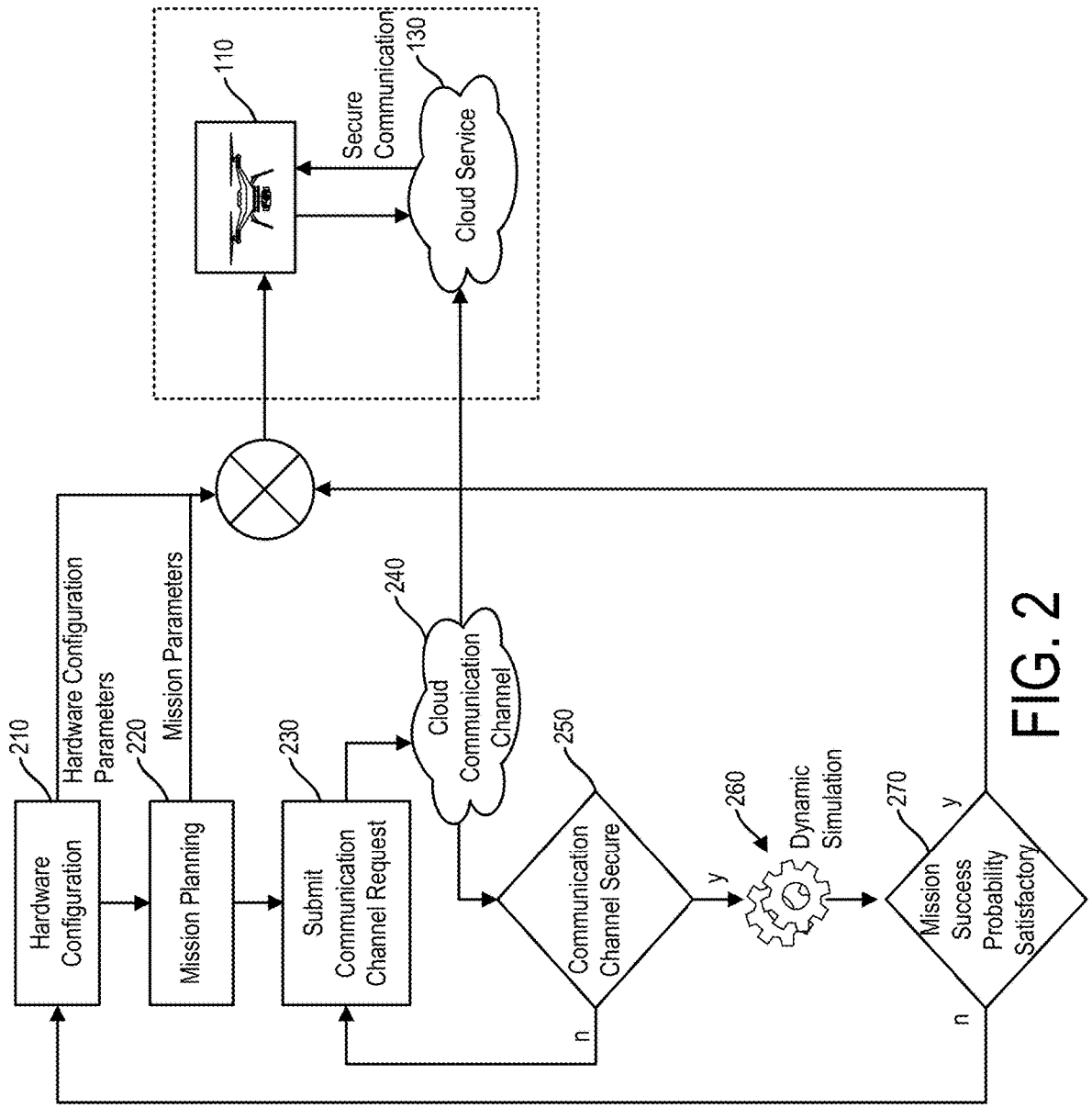
FIG. 2-FIG. 6 are a series of flowcharts illustrating various aspects of providing operation services by an unmanned vehicle with cloud-based connectivity consistent with implementations of the current subject matter.

With reference to FIG. 2, a process flow chart 200 illustrates features of a method related to initiating startup of the unmanned vehicle 110 according to implementations of the current subject matter, which may optionally include some or all of the following. At 210, a hardware configuration operation is performed. This may include receiving user-input, via the external processing unit 135, relating to features of the unmanned vehicle 110 (e.g., type of drone, model number, manufacturer, type of hardware, hardware capabilities, sensors, size, weight, etc.). The hardware configuration related to the unmanned vehicle 110 may be stored and associated with the unmanned vehicle 110 for future operations.

According to some aspects of the current subject matter, the server 130 may provide hardware configuration recommendations based on various factors. For example, weather conditions may have an effect on certain hardware configuration recommendations. At start-up, the server 130 may evaluate weather conditions (e.g., wind speed, wind direction, etc.) to determine initial hardware configuration recommendations.

At 220, a missing planning phase may include receiving input (e.g., user input) related to a specific mission (e.g., inspection of an asset or facility or other operation) being performed. This may include, for example, parameters related to the asset/facility (e.g., location (waypoints in a global positioning system)), requirements for data collection (e.g., the type of data required or desired to be collected), and relevant safety procedures.

Mission planning may be considered as the phase in which a user defines where the unmanned vehicle 110 will go and the actions to be taken at various locations. This may be implemented as a sequence of tasks that need to be followed by the unmanned vehicle 110. As an example, the following is a sample sequence of tasks that may be part of the mission planning: [1] takeoff at 2 meters; [2] head to coordinates {Lat1, Long1} at 40 m; [3] circle around position {Lat2, Long2} and take a picture of given asset while circling the asset at every 34 degrees (or every 10 seconds); [4] evaluate data collected and wait for server input; [5] follow server instructions (e.g., recollect pictures, land, etc.) or continue mission; and [6] return to base.

Once the hardware configuration process and the mission planning process are completed, at 230 a request is sent to the server 130 to establish a communication channel (represented by 240 in FIG. 2) with the unmanned vehicle 110 for mission control. The communication channel may also include a channel with the one or more controllers 115a,b and/or the external processing unit 135.

At 250, a determination may be made to verify if the communication channel 240 between the unmanned vehicle 110, the server 130, the one or more remote controllers 115a,b, and/or the external processing unit 135 is secure. If it is determined that the communication channel 240 is not secure, one or more subsequent attempts are made (at 230) to establish a secure communication channel.

At 260, following verification of the security of the communication channel 240 at 250, dynamic simulation methods may be implemented, using for example the completed set of waypoints and data collection requirements from the hardware configuration (210) and the mission planning (220), to evaluate a success probability of the mission. An algorithm used to perform this assessment may utilize a simplified model of the unmanned vehicle 110 and insert randomness in various aspects of the model (e.g., weather conditions, battery performance, etc.). The algorithm effectively generates a series of simulations and calculates the number of successful ones against the total. Other algorithms may be used to evaluate a success probability.

If, at 270, mission success likelihood is deemed acceptable (e.g., greater than a predetermined threshold or at a level deemed acceptable by an operator or user), the unmanned vehicle 110 may be cleared to begin the mission. If at 270 the mission success likelihood is not acceptable (e.g., less than the predetermined threshold or below the level deemed acceptable by the operator/user), the process may return to 210 to repeat the hardware configuration and subsequent operations.

During the mission, the communication channel 240 between the unmanned vehicle 110, the server 130, and ground station (e.g., the one or more controllers 115a,b and/or the external processing unit 135) is used to exchange messages and collect specific data. Each message may include sender identification, service request flags, and/or data payload (i.e., the actual information content of the message). Upon receipt of a message, the server 130 may accordingly act upon each one by executing the message through persistent services or by triggering an on-demand service depending on the service request flag. Examples of various services are provide below.

Figure 3:
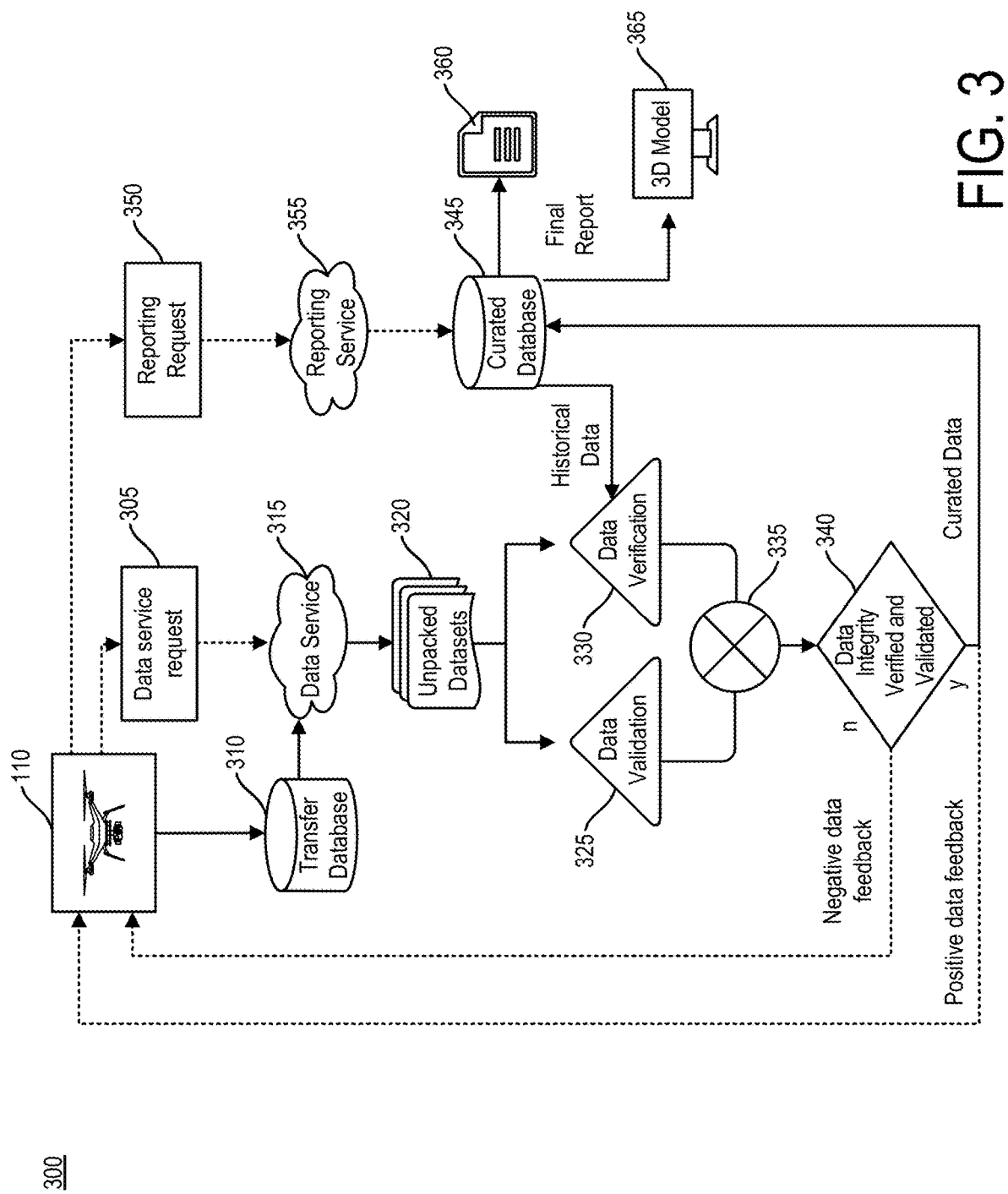

With reference to FIG. 3, a process flow chart 300 illustrates features of a method related to data service functionality provided by the server 130 for a mission of the unmanned vehicle 110.

Consistent with implementations of the current subject matter, the server 130 may offer data curation methods and automatic reporting services for mission logging and inspection data integrity verification. The service may be started by a data service request (305) from the unmanned vehicle 110. Exported data from the unmanned vehicle 110 may temporarily be stored in a temporary transfer database 310. The temporary transfer database 310 may hold the data until a feedback is received from the unmanned vehicle 110 to, for example, ensure minimal data loss.

The data service operation 315 of the server 130, in response to the data service request (305), pulls data points from the temporary transfer database 310 and processes the data to obtain unpacked datasets 320. The unpacked datasets 320 are processed by a data validation method 325 and a data verification method 330. The methods 325, 330 are procedures to validate and verify collected data through the use of physical and historical information to, for example, identify spurious data and accordingly alert the user.

The data validation method 325, consistent with implementations of the current subject matter, involves the process of verifying if collected data is consistent with physical aspects of, for example, an asset being inspected and may involve checking data points against physical models (e.g., geometrical and material properties of the asset being inspected). For example, if a plate thickness reading of 50 mm from a structure known to have a plate thickness of 20 mm, the data validation method 325 will identify this inconsistency. On the other hand, if the collected data indicates a plate thickness reading within a certain threshold (e.g., 0.1%, 1%, etc.—which may depend on the type of data being collected) of the actual known plate thickness, then the data validation method 325 validates the data as valid.

The data verification method 330, consistent with implementations of the current subject matter, involves the process of comparing the collected data against historical values collected from, for example, the asset being inspected (i.e., verification for data consistency against historical data). Such verification may include checking the collected data against historical data from a curated database 345 and identifying historical outliers that may indicate that the data needs to be recollected and/or that need to be brought to the attention of a user, such as for example an operator of the unmanned vehicle 110.

The outcome of both assessments 325, 330 are combined in a data curation procedure 335 and result in a feedback (e.g., positive data feedback or negative data feedback) to the unmanned vehicle 110, which may perform data recollection (based on a determination at 340 that the data does not satisfy one or more of the data validation assessment and the data verification assessment) or carry on with the mission and optionally signal to the temporary transfer database 310 an order to delete the data (based on a determination at 340 that the data does satisfy the data validation assessment and the data verification assessment).

The assessments 325, 330 are thus used to ensure the collected data is sound and also to identify issues with the collected data in real-time or near real-time. For example, the assessments may indicate that the data is sound (e.g., valid) but may also indicate a problem or issue that needs to be remedied.

If the data collected is positive (based on a determination at 340 that the data does satisfy the data validation assessment and the data verification assessment), it is sent to a curated database 345, where it is efficiently stored. A three-dimensional model 365 of the asset or facility may link the information in the curated database 345 with its geometrical representation, providing a user-friendly and accessible form of visualization.

Consistent with implementations of the current subject matter, an unmanned vehicle 110 may initiate a reporting request (350), with a reporting request flag, to the server 130. This may initiate, by the reporting service operation 355 of the server 130, to aggregate the curated data and produce an immutable record 360 of the mission log and operation findings as well as a model, for example a 3D model, 365.

Figure 4:
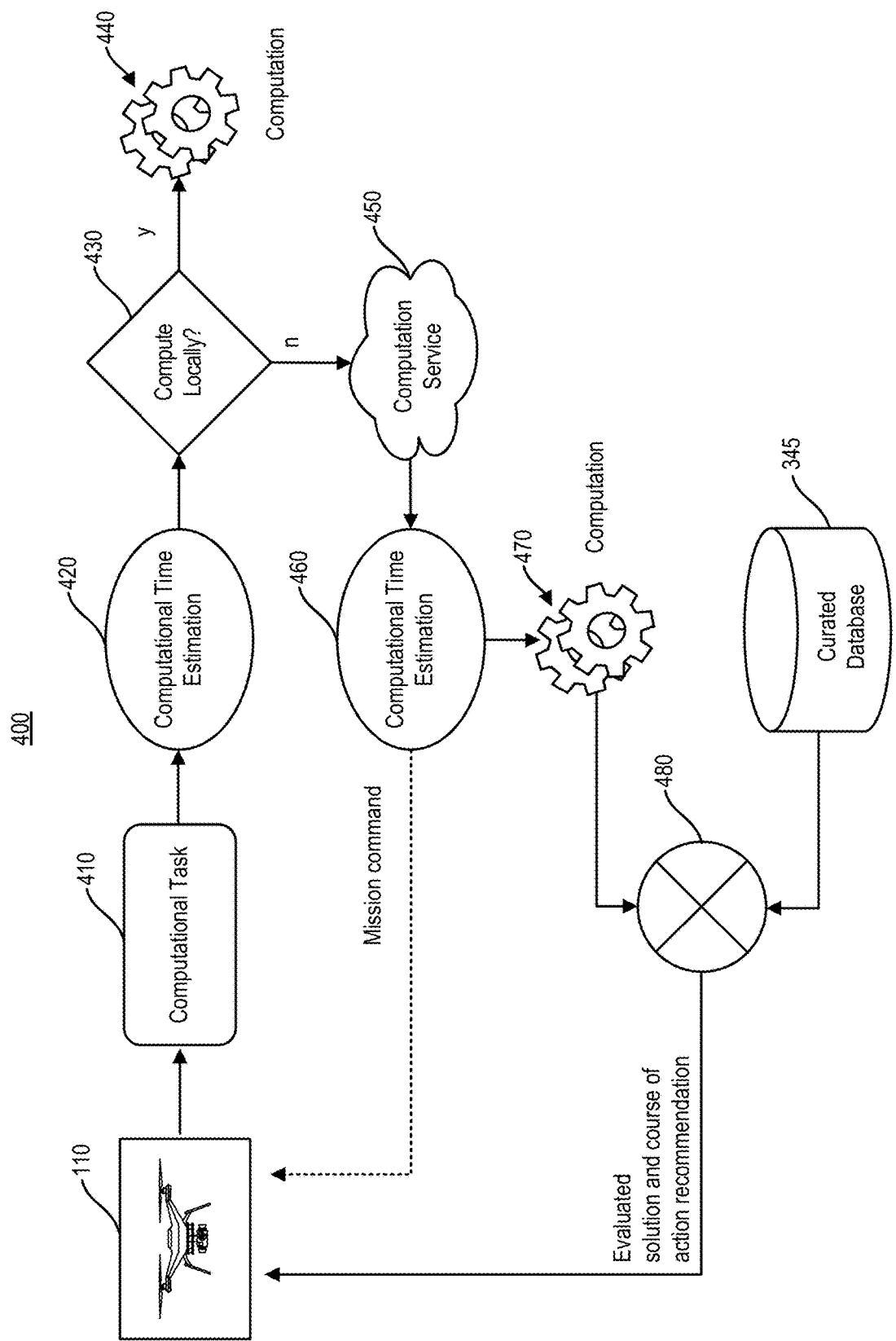

According to additional aspects of the current subject matter, extended computational power services may be provided by the server 130. With reference to FIG. 4, a process flow chart 400 illustrates features of a method related to such extended computational power services provided by the server 130 for a mission of the unmanned vehicle 110.

A computational task is initiated at 410. Certain classes of computer vision and machine learning problems can take significant processing power (and energy) to be properly processed. At 420, in some instances, the unmanned vehicle 110 may attempt to estimate the required computational time (with local processes) to solve a given task. At 430, the estimated time may be compared to a system-specific threshold to decide whether to compute the task locally (at 440) or to delegate it to a computation service functionality 450 of the server 130 (at 450). Locally computed tasks may include those that are simply processed to return solutions.

At 460, tasks delegated to the server 130 may be re-evaluated for required processing time. The evaluation may yield a mission command that may instruct the unmanned vehicle 110 relating to the requested computational task. For example, the command may include instructions to hold position or append the mission plan with additional inspection points or other relevant information depending on the estimated time required to process the task.

At 470, the computational task is processed by the server 130. At 480, once the computational task is processed, a solution and/or course of action may be determined, which may be returned to the unmanned vehicle 110 as one or more action recommendations.

The unmanned vehicle 110 may be capable of tagging certain tasks as critical based on the importance of their solution to the overall operation. Critical tasks may also be predefined in mission planning and stored in the curated database 345. Such tasks may be assigned infinite local processing time and hence immediately be delegated to the server 130. These tasks may be assigned additional processing cores in the server 130 for faster responses. In some instances, the unmanned vehicle 110 may halt its mission until response from the server 130 is retrieved.

According to some aspects of the current subject matter, critical tasks are ones involving identification of safety-related conditions. In an oil refinery, for example, identifying leaks of hydrogen sulfide may be defined as critical, because of the severe consequences of exposure to humans. In a security application, identifying if a person is carrying a weapon may be deemed as a critical task.

According to additional aspects of the current subject matter, the server 130 may also provide simulation services. The server 130 may provide seamless integration of complex numerical simulation services to the unmanned mission. These simulations may supplement the understanding of operation findings, especially in extraordinary cases (e.g., safety-critical defects or in cases where the operation of the asset is significantly affected). The simulation services may incorporate data analysis, machine learning, fluid dynamics, thermodynamics, and mechanics of solids simulations to the operation (e.g., inspection) process to allow the system to provide accurate and meaningful insights during missions and empower user decisions with data and sound engineering principles.

Figure 5:
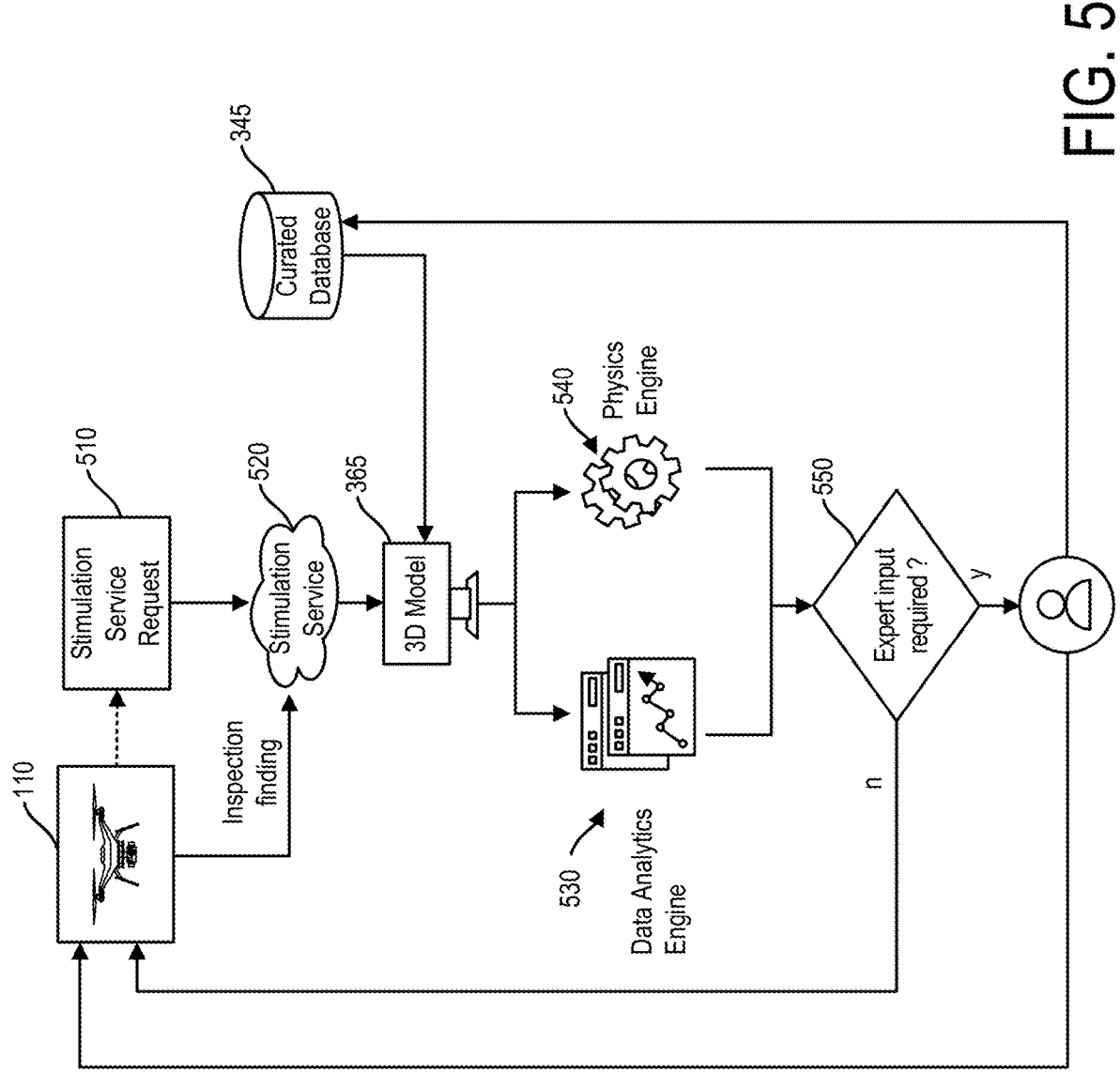

With reference to FIG. 5, a process flow chart 500 illustrates features of a method related to the server 130 providing simulation services for a mission relating to an operation of the unmanned vehicle 110. At 510, a simulation service request is initiated by the unmanned vehicle 110 for processing by the simulation service functionality 520 of the server 130. A simulation request message may originate from either the ground station (operator/user of one or more of the remote controllers 115a,b or operator/user of the external processing unit 135) or by the unmanned vehicle 110. The simulation request may include, for example, data payload and a simulation package. The data payload may include relevant details of the inspection findings so that the simulation process may accurately reproduce the conditions found on site. The simulation package may include specific simulation requirements such as which simulation engine is needed and specific questions that should be answered by running numerical simulations of the asset.

The curated database 345 may be accessed by the server 130 for the 3D model 365 (described above with reference to FIG. 3). A data analytics engine 530 may process requests for data analytics, which may include verification of readings against historical data for forecasting of patterns from findings on site. This verification may be used to, for example, prevent defect escalation. This type of request may, for example, request the estimated plate thickness diminution from readings on a ship hull to verify that value against statutory requirements.

A physics engine 540 may process requests that may typically be aimed at deepening the understanding of a problem under the scope of their physical nature. For example, the physics engine 540 may evaluate the load redistribution on a structure given that a defect was spotted on site and further evaluate how the structure may behave under certain loads.

The simulation request service may include, at 550, a determination as to whether a request for subject matter expert review is necessary. In general, simulation requests may be handled manually until enough historical data and accurate three-dimensional models are available for any given asset.

Once all simulation questions are addressed on the server-side, the subject matter expert (or, the simulation engine) may submit replies to the field and the operation may continue accordingly.

According to additional aspects of the current subject matter, the server 130 may also provide programming services. Consistent with implementations of the current subject matter, the communication link between the server 130 and the unmanned vehicle 110 enables the remote operation of the unmanned vehicle 110. A graphical user interface may be available (e.g., via the external processing unit 135) as a persistent service for remote mission planning, execution, and control of unattended missions.

In accordance with implementations of the current subject matter, a programming interface service may expose application programming interfaces (APIs) for standard internet protocol access so that the system may interact with external services and automated tasks can be created and managed. Through the programming interface, users have an ability to configure and automate persistent tasks on the system. The programming interface may expose the control over cloud functionality to users via intuitive programming methods, such as drag-and-drop, or flowcharts of algorithms such that users can, for example, customize their experience, functionality, and access to data. The programming interface may be preconfigured to provide users with access to data and configuration methods to grant third-party customized data and configuration tools, such as schedule missions and notifications for custom performance indicators.

Figure 6:
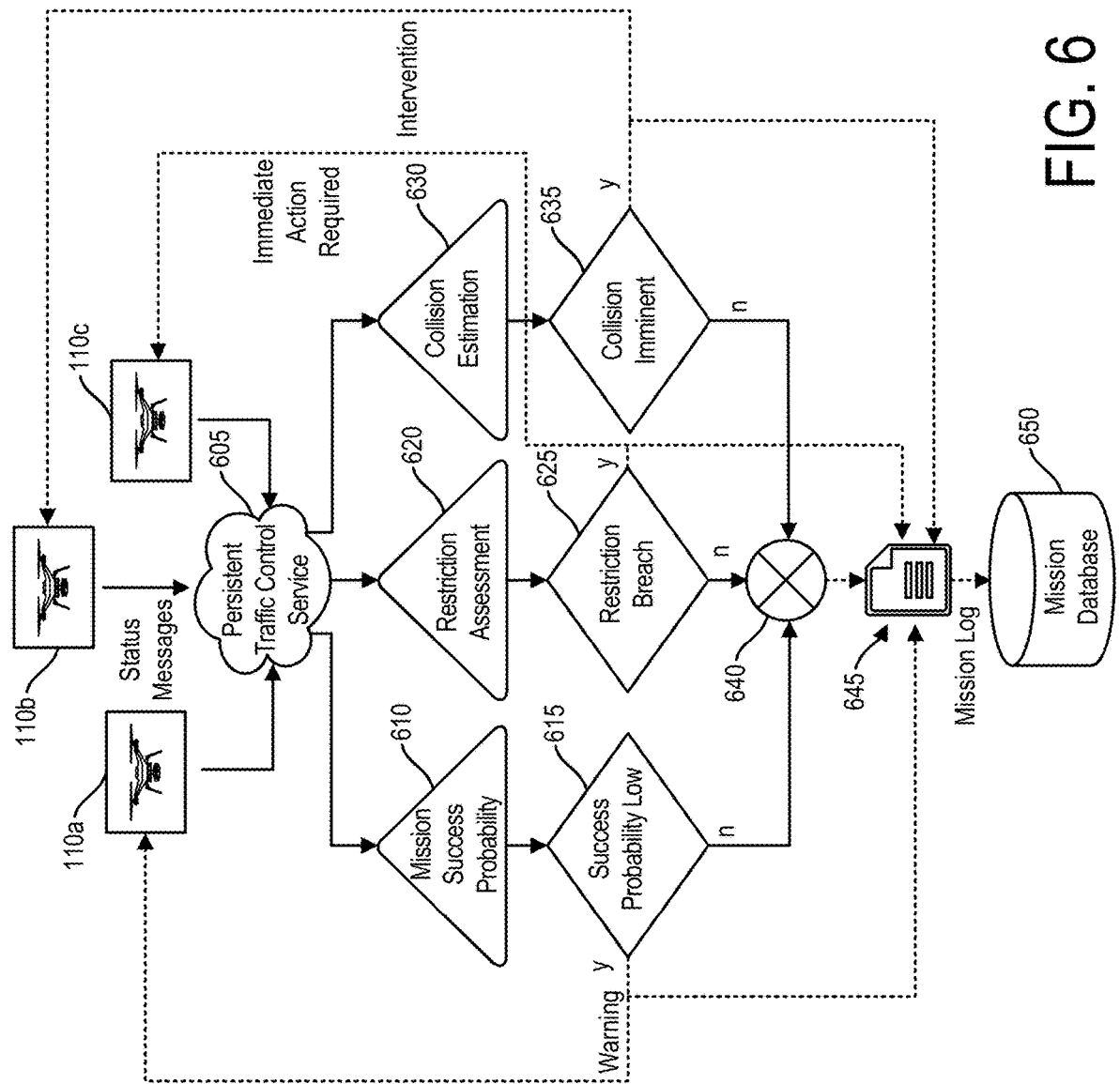

According to additional aspects of the current subject matter, fleet management services may be provided by the server 130. With reference to FIG. 6, a process flow chart 600 illustrates features of a method related to such fleet management services provided by the server 130 for a mission of the unmanned vehicle 110.

Fleet management may relate to traffic management and may relate to a plurality of connected unmanned vehicles 110*a,b,c* broadcasting, to the server 130, mission status messages at regular intervals. These messages may include geolocation, heading, speed, status of sensors and batteries, mission goals, etc.

The persistent traffic control service 605 of the server 130 collects this information from the unmanned vehicles 110*a,b,c* and processes the information to verify data and determine potentially unsafe situations (e.g., undue battery consumption, imminent collision risk, and/or malfunction forecasting). Moreover, the traffic control service 605 may incorporate operational constraints, such as, for example, restricted airspace locations. The traffic control service 605 may also provide real-time permissioned access to mission logs and ongoing missions to regulatory bodies. With this functionality, compliance inquiries, procedure verification, and pilot accreditation may be expedited and digitalized. A system of automatic failure reporting and non-compliance alerts is also integrated into the service 605 to provide additional safety layers to the remote operation of unmanned vehicles 110.

Consistent with implementations of the current subject matter, the server 130 may broadcast three classes of safety messages to unmanned vehicles 130: warnings, immediate action requests, and interventions. Additional messages may also be determined and broadcast.

With the collected information, the traffic control service 605 may determine, at 610, mission success probability. If the success probability is low (e.g., below a predefined threshold), as determined at 615, a warning message may be generated and provided to an operator (e.g., at one of the remote controllers 115*a,b* and/or at the external processing unit 135). A warning message may be recorded in a mission log (645) but will generally not force any particular action by the unmanned vehicle 110. These messages may include caution recommendations and/or requests for future maintenance. Algorithms used to determine probabilistic calculation of mission success in this function may include dynamic simulation to run a series of "controlled" tests with a certain level of randomness to evaluate the overall likelihood of mission completion. If success probability is below a predefined threshold, a warning message is issued as described.

With the collected information, the traffic control service 605 may perform, at 620, a restriction assessment. If, at 625, a restriction breach is determined from for example regulatory non-compliance situations (e.g., invasion of controlled airspace), an immediate action request may be generated and transmitted. Such actions may demand immediate action from operators and include remediation tactics. If these issues are not addressed within a reasonable time, the server 130 may forcibly command the unmanned vehicle 110 to enter a pre-configured failsafe mode and halt operation. In this scenario, relevant information may be recorded in the mission log 645.

With the collected information, the traffic control service 605 may also perform, at 630, a collision estimation. If, based on the collision estimation, it is determined at 635 that a collision is imminent, an intervention message may be provided to immediately halt operation of the unmanned vehicle 110. These interventions target at-risk unmanned vehicles 110, and operations of all parties involved may be halted. Such information may also be recorded in the mission log 645.

The mission log 645 also compiles relevant information that is determined to not necessitate one of the safety messages. The mission log 645 may provide the information to a mission database 650 for storage and future access.

The following is an example implementation consistent with certain aspects of the current subject matter and is provided as an exemplary, non-limiting sequence to illustrate operation and performance of the system described herein.

A structural and safety inspection (e.g., an operation service or mission) of an oil refinery (e.g., an asset) is to be performed by an unmanned vehicle, such as the unmanned vehicle 110. The detailed requirements of the mission include performing a close-up visual inspection of a distillation tower and flare. Thermal imagery from the distillation tower is to be collected, and an overall inspection with thermal imagery is to be performed to assess potential leaks of hydrogen sulfide.

A startup sequence includes hardware configuration and mission planning. With respect to hardware configuration, at startup, the system may instruct or prompt the operator/user to input basic hardware configurations (e.g., the modules attached to the vehicle, which may include but are not limited to the following with example, non-limiting specifications: airframe module—quadcopter X4; propulsion module—6450 props with 920 kv motors; power module—8000 mAh battery pack; vision module—8 MP computer vision module on gimbal; thermal imagery payload—thermal camera and gimbal).

Mission planning may include a user defining a mission plan as follows: 1. Take off at 2 m and perform system check; 2. Raise to mission altitude, head to structure perimeter and circle around structure collecting imagery for mapping and thermal evaluation; Send data service requests on both data packets collected; 3. Wait for feedback; 4. Head to refinery's distillation tower position and begin data and simulation service requests; 5. Perform flight around distillation tower and respond to feedback, if any received; 6. Perform fly over of the structure for final image collection; and 7. Return to base.

Dynamic simulation may include, by using the determined hardware configuration, that the system determines probability of success is low due to insufficient battery power margin. A recommendation may be made to, for example, switch the power module to 12000 mAh. The configuration may be adjusted, and communication channels with the server established.

With respect to the actual mission, the following is provided as a purely exemplary, non-limiting description of a mission sequence that may occur: 1. Drone takes off to 2 m and performs basic system checks; Continues; 2. Mission altitude is reached and vehicle heads towards perimeter of installation; Data service request to verify quality for photogrammetric composition of 3D model of installation is sent to cloud; Data service request for thermal imagery involves evaluation of anomalies in production (identification of abnormal temperature profiles, leaks, etc.) is sent to cloud; 3. Vehicle circles installation perimeter; 4. Photogrammetry data is collected successfully; Thermal profile of transfer pump #1 indicates potential hydrocarbon evasion; Recommendation to recollect data is received on site and operator redirects vehicle to that location; 5. Closer inspection and thermal imagery indicate transfer pump #1 presents small content of hydrocarbon evasion; Maintenance recommendation is added to database; Feedback from servers—continue mission; 6. Vehicle reaches distillation tower and begins data request for structural defect identification and mechanics of solids simulation service request; 7. At the top of the distillation tower a small crack is identified; Simulation services are requested to evaluate the impact on the overall structural integrity of the tower; Vehicle awaits feedback; 8. At headquarters, a mechanics of solids expert analyses the simulation results and concludes the position and configuration of the crack are insignificant to the integrity of the tower; Vehicle carries on with the mission; 9. Vehicle completes distillation tower inspection and adds findings to mission log; Continues to fly-over the installation; 10. While heading towards fly over starting point, traffic control service indicates potential power module malfunction; Energy consumption is deemed excessive and energy reserves insufficient to safely conduct the remainder of the operation and return to base; 11. Operator is alerted, acknowledges the warning and halts the vehicle fly-over, redirecting it to return to base; Return to base command triggers reporting service and automated reports log the flight data and mission findings into an immutable ledger, safely recording findings; and 12. Cloud services allow instant access to database and computational models to the client in real-time, allowing for immediate corrective actions on transfer pump #1 leak.

The architecture of the system consistent with implementations of the current subject matter allows for the provision of invaluable feedback to the vehicle and operators on site to improve the quality and accuracy of the inspection service. Without data services validating the collected data in real time, the client would only be aware of pump leaks days after inspection, the crack identified on the distillation tower most likely would have halted its operation until further analysis was done. In an alternative scenario, where the crack was deemed to be critical, it could have taken a conventional system several days to bring attention to the issue with potentially catastrophic consequences.

Figure 7:
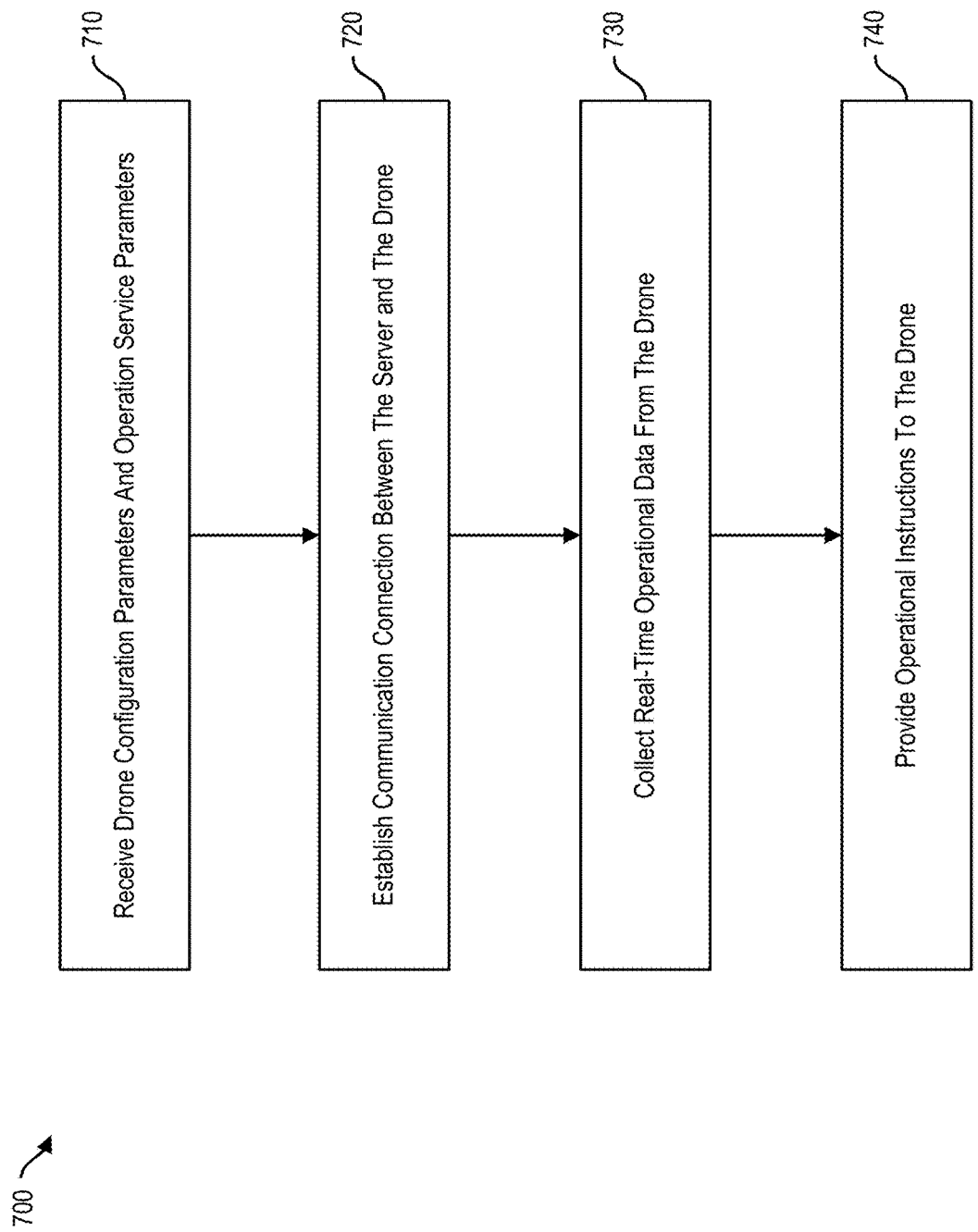
FIG. 7 is a flowchart illustrating a process consistent with implementations of the current subject matter.

FIG. 7 depicts a flowchart illustrating a process 700 consistent with implementations of the current subject matter.

At 710, the server 130 receives drone configuration parameters related to a drone (e.g., the unmanned vehicle 110) and operation service parameters related to an operation service (e.g., mission) to be performed by the drone. The drone configuration parameters and the operation service parameters may be, for example, user inputs inputted into the external processing unit 135 connected to the server 130. The drone configuration parameters may include, for example, features of the drone, such as type of drone, model number, manufacturer, type of hardware, hardware capabilities, sensors, size, weight, etc. The operation service parameters may include data related to the specific operation service or mission (e.g., inspection of an asset or facility or other operation) being performed. This may include, for example, parameters related to the asset/facility (e.g., location (waypoints in a global positioning system)), requirements for data collection (e.g., the type of data required or desired to be collected), and relevant safety procedures.

At 720, a communication connection between the server 130 and the drone may be established. For example, after receipt of the drone configuration parameters and the operation service parameters, which may be used for the hardware configuration process and the mission planning process, a request may be sent to the server 130 to establish a communication channel (e.g., 240 in FIG. 2) with the unmanned vehicle 110 for mission control.

In some implementations, after establishment of the communication connection between the server 130 and the drone, the server 130 may transmit to the drone an initiation message indicating that the drone can begin the operation service. The initiation message may be in response to a determination by the server 130 that a success probability of the operation service exceeds a predetermined threshold. Consistent with implementations of the current subject matter, the success probability may be based on, for example, a series of simulations utilizing a simplified model of the drone and the operation service to be performed by the drone.

Returning to FIG. 7, at 730, the server 130 may collect real-time operational data from the drone. For example, the drone may collect data in accordance with the operation service parameters, and this data may be collected in real-time or near real-time by the server 130 through the communication connection between the server 130 and the drone.

At 740, the server 130 may provide operational instructions to the drone. The operational instructions may be based on one or more of the drone configuration parameters, the operation service parameters, and the real-time operational data. For example, based on the collected real-time operational data, the server 130 may provide the operational instructions to indicate one or more actions to be taken by the drone. Such actions may include, for example, collection of additional data. In some implementations, the operational instructions may include one or more warning messages relating to one or more of success probability, restriction assessments, and collision estimates. For example, with respect to a collision estimate warning message, the server 130 may control the drone to halt operations in response to a determination of a possible collision. Such control may be in the form of operational instructions sent from the server 130 to the drone. Additionally and/or alternatively, the control to halt operations may be after a predefined period of time after transmission of the collision estimate warning message.

Consistent with additional implementations of the current subject matter, the server 130 may implement a computational request, which may be done in response to receipt from the drone of the computational request. The implementation of the computational request may require that the server 130 instructs the drone relating to, for example, a positioning of the drone to capture data for the computational request.

The server 130 may also generate a simulation of the operation service. The simulation may be based at least in part on the real-time operational data from the drone.

Moreover, the server may provide an application programming interface (API) to the external processing unit 135 to provide control relating to the drone and the operation services to a user of the external processing unit 135.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. References to a structure or feature that is disposed "adjacent" another feature may have portions that overlap or underlie the adjacent feature.

Terminology used herein is for the purpose of describing particular embodiments only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as, for example, "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

In the descriptions above and in the claims, phrases such as, for example, "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for controlling a drone comprising:

receiving, by a server, drone configuration parameters related to the drone and inputs related to a mission to be performed by the drone, the specific mission comprising inspection of an asset or facility, the drone configuration parameters comprising one or more of a type of drone, a model number of the drone, a manufacturer of the drone, a type of hardware, one or more hardware capabilities of the drone, a sensor associated with the drone, a size of the drone, and a weight of the drone, the input comprising location waypoints for the mission, a requirement for a type of data to be collected, relevant safety procedures for the asset or facility, and a sequence of tasks to be performed by the drone in inspecting the asset or facility;

establishing, by the server, a communication connection between the server and the drone;

implementing, by the server, a dynamic simulation to evaluate a success probability of the mission, the implementing comprising use of a simplified model of the drone with insertion of randomness into aspects of the model comprising weather conditions and battery performance to generate a series of simulations and to calculate a success probability by calculating a number of successful simulations against a total number of simulations;

clearing, by the server the drone to begin the mission if the success probability exceeds a predetermined threshold;

collecting, by the server, real-time data collected by one or more sensors on the drone during performance of the mission;

comparing, by the server the collected real-time data against relevant historical values for the asset or facility; and providing, by the server, feedback instructions to the drone based on the comparing, wherein the feedback instructions comprise instructing the drone to continue the mission consistent with the input or instructing the drone to perform data recollection if indicated by the comparing.

2. The method of claim 1, wherein the drone configuration parameters and the inputs are inputted by a user into an external processing unit connected to the server.

3. The method of claim 1, further comprising:
transmitting, by the server and in response to a determination by the server that the success probability of the operation service exceeds the predetermined threshold, an initiation message to the drone, the initiation message indicating the drone can begin the mission.

4. The method of claim 1, further comprising:
implementing a computational task by the server in response to receipt from the drone of a computational request, the computational request being generated by the drone when an estimated time to complete the computational task locally at the drone exceeds a system-specific threshold.

5. The method of claim 4, wherein the implementing comprises instructing the drone relating to positioning of the drone to capture data for the computational request.

6. The method of claim 1, further comprising:
generating, by the server, a simulation of the operation service, the simulation based at least in part on the collected real-time data from the drone;
running, by the server, a series of controlled simulation tests with a certain level of randomness to evaluate an overall likelihood of mission completion; and
issuing, by the server, a warning message if the overall likelihood is below a warning threshold.

7. The method of claim 1, wherein the warning message relates to one or more of success probability, restriction assessments, and collision estimates.

8. The method of claim 7, further comprising:
controlling, by the server and after a predefined period of time after transmission of a collision estimate warning message, the drone to halt operations in response to a determination of a possible collision.

9. The method of claim 1, further comprising:
providing, by the server, an application programming interface to an external processing unit to provide control relating to the drone and the operation services to a user of the external processing unit.

10. A system for controlling a drone comprising:
at least one data processor; and
at least one memory storing instructions which, when executed by the at least one data processor, result in operations comprising:
receiving drone configuration parameters related to the drone and inputs related to a mission to be performed by the drone, the specific mission comprising inspection of an asset or facility, the drone configuration parameters comprising one or more of a type of drone, a model number of the drone, a manufacturer of the drone, a type of hardware, one or more hardware capabilities of the drone, a sensor associated with the drone, a size of the drone, and a weight of the drone, the input comprising location waypoints for the mission, a requirement for a type of data to be collected, relevant safety procedures for the asset or facility, and a sequence of tasks to be performed by the drone in inspecting the asset or facility;
establishing a communication connection between the server and the drone;
implementing a dynamic simulation to evaluate a success probability of the mission, the implementing comprising use of a simplified model of the drone with insertion of randomness into aspects of the model comprising weather conditions and battery performance to generate a series of simulations and to calculate a success probability by calculating a number of successful simulations against a total number of simulations;
clearing the drone to begin the mission if the success probability exceeds a predetermined threshold;
collecting real-time data collected by one or more sensors on the drone during performance of the mission;
comparing the collected real-time data against relevant historical values for the asset or facility; and
providing instructions to the drone based on the comparing, wherein the feedback instructions comprise instructing the drone to continue the mission consistent with the input or instructing the drone to perform data recollection if indicated by the comparing.

11. The system of claim 10, wherein the drone configuration parameters and the inputs are inputted by a user into an external processing unit connected to the system.

12. The system of claim 10, wherein the instructions, when executed, cause operations further comprising:
transmitting, by the server and in response to a determination by the system that the success probability of the operation service exceeds the predetermined threshold, an initiation message to the drone, the initiation message indicating the drone can begin the mission.

13. The system of claim 10, wherein the instructions, when executed, cause operations further comprising:
implementing, in response to receipt from the drone of a computational request, the computational request;
implementing a computational task in response to receipt from the drone of a computational request, the computational request being generated by the drone when an estimated time to complete the computational task locally at the drone exceeds a system-specific threshold.

14. The system of claim 13, wherein the implementing comprises instructing the drone relating to positioning of the drone to capture data for the computational request.

15. The system of claim 10, wherein the instructions, when executed, cause operations further comprising:
generating a simulation of the operation service, the simulation based at least in part on the collected real-time data from the drone;
running a series of controlled simulation tests with a certain level of randomness to evaluate an overall likelihood of mission completion; and
issuing a warning message if the overall likelihood is below a warning threshold.

16. The system of claim 10, wherein the warning message relates to one or more of success probability, restriction assessments, and collision estimates.

17. The system of claim 16, wherein the instructions, when executed, cause operations further comprising:
controlling, after a predefined period of time after transmission of a collision estimate warning message, the drone to halt operations in response to a determination of a possible collision.

18. The system of claim 10, wherein the instructions, when executed, cause operations further comprising:

providing an application programming interface to an external processing unit to provide control relating to the drone and the operation services to a user of the external processing unit.

19. A non-transitory computer readable medium storing instructions, which when executed by at least one data processor, result in operations for controlling a drone comprising:

receiving, by the server, drone configuration parameters related to the drone and inputs related to a mission to be performed by the drone, the specific mission comprising inspection of an asset or facility, the drone configuration parameters comprising one or more of a type of drone, a model number of the drone, a manufacturer of the drone, a type of hardware, one or more hardware capabilities of the drone, a sensor associated with the drone, a size of the drone, and a weight of the drone, the input comprising location waypoints for the mission, a requirement for a type of data to be collected, relevant safety procedures for the asset or facility, and a sequence of tasks to be performed by the drone in inspecting the asset or facility;

establishing, by the server, a communication connection between the server and the drone;

implementing a dynamic simulation to evaluate a success probability of the mission, the implementing comprising use of a simplified model of the drone with insertion of randomness into aspects of the model comprising weather conditions and battery performance to generate a series of simulations and to calculate a success probability by calculating a number of successful simulations against a total number of simulations;

clearing the drone to begin the mission if the success probability exceeds a predetermined threshold;

collecting, by the server, real-time data collected by one or more sensors on the drone during performance of the mission;

comparing the collected real-time data against relevant historical values for the asset or facility; and providing, by the server, feedback instructions to the drone based on the comparing, wherein the feedback instructions comprise instructing the drone to continue the mission consistent with the input or instructing the drone to perform data recollection if indicated by the comparing.

* * * * *